United States Patent [19]
Franks

[11] Patent Number: 5,250,187
[45] Date of Patent: Oct. 5, 1993

[54] RESIN BED FOR LIQUID TREATMENT

[75] Inventor: Jeffrey G. Franks, Menomonee Falls, Wis.

[73] Assignee: Autotrol Corporation, Milwaukee, Wis.

[21] Appl. No.: 723,364

[22] Filed: Jun. 28, 1991

Related U.S. Application Data

[63] Continuation-in-part of Ser. No. 560,472, Jul. 27, 1990, abandoned, which is a continuation of Ser. No. 308,076, Feb. 8, 1989, abandoned.

[51] Int. Cl.$^5$ .............................................. B01D 15/04
[52] U.S. Cl. .................... 210/661; 210/672; 210/269; 210/279; 210/288; 210/291
[58] Field of Search ............... 210/661, 189, 269, 279, 210/288, 291, 672

[56] References Cited

U.S. PATENT DOCUMENTS

| | | | |
|---|---|---|---|
| 3,048,274 | 8/1962 | Lundeen | 210/101 |
| 3,382,169 | 5/1968 | Thompson | 210/673 |
| 3,385,787 | 5/1968 | Crits et al. | 210/673 |
| 3,386,914 | 6/1968 | Hunter | 210/678 |
| 3,414,508 | 12/1968 | Applebaum et al. | 210/673 |
| 3,458,436 | 7/1969 | Martinola et al. | 210/20 |
| 3,617,558 | 11/1971 | Jones | 210/377 |
| 3,645,922 | 2/1972 | Weiss et al. | 260/2.1 R |
| 3,991,017 | 11/1976 | Barrett et al. | 260/2.1 R |
| 4,035,292 | 7/1977 | Himsley | 210/676 |
| 4,120,786 | 10/1978 | Peterson et al. | 210/675 |
| 4,198,295 | 4/1980 | Vajna | 210/662 |
| 4,202,737 | 5/1980 | Shimizu | 210/32 |
| 4,228,013 | 10/1980 | Degenkolb et al. | 210/264 |
| 4,238,325 | 12/1980 | Heskett | 210/678 |
| 4,298,468 | 11/1981 | Heskett | 210/136 |
| 4,337,153 | 6/1982 | Prior | 210/288 |
| 4,379,057 | 4/1983 | Meiser et al. | 210/662 |
| 4,421,652 | 12/1983 | Heskett | 210/687 |
| 4,451,361 | 5/1984 | Paterson | 210/136 |
| 4,461,706 | 7/1984 | Siegers | 210/275 |
| 4,661,258 | 4/1987 | Phillips | 210/661 |
| 4,737,275 | 4/1988 | Franks | 210/91 |
| 4,787,987 | 11/1988 | Hensley | 210/792 |
| 4,804,465 | 2/1989 | Brown | 210/136 |
| 5,094,694 | 3/1992 | La Brie et al. | 210/660 |

FOREIGN PATENT DOCUMENTS 0051210 5/1982 European Pat. Off. .

OTHER PUBLICATIONS

I. M. Abrams—"New Developments in Counter-Current Fixed Bed Ion Exchange" (1973).
Wofatit-Information 1978—"Advantages of the Suspension Bed Procedure".
Martinola et al.—"Liftbed and Rinsebed Process, a Novel Technique in Ion Exchange".
I. M. Abrams—"Counter-Current Ion Exchange With Fixed Beds" (1973).
Mobay Chemical Corp.—"Lewatit Fluidized Bed System".
Mobay Chemical Corp.—"WS, Rinsebed, and Liftbed Systems".
Dow Chemical Co.—"New Dowex Monosphere TG" (1984).
James M. Montgomery—"Water Treatment Principles and Design" (1985).
Michael D. Mayne et al. "Evaluation of Uniform Mesh Ion Exchange Resins for Condensate Polishing".
Friedrich B. Martinola—39th Annual Meeting International Water Conference. "The Lewatit-WS-Process a Highly Reliable Counter-Current System of Ion Exchange and Adsorption" (1978).

Primary Examiner—Stanley S. Silverman
Assistant Examiner—Cynthia L. Nessler
Attorney, Agent, or Firm—Quarles & Brady

[57] ABSTRACT

A method of treating fluid in a bed of ion exchange resin wherein in one embodiment the resin is of a high kinetic type and water is introduced upwardly through the bed to effect a complete fluidized resin bed. The high kinetic resin is of a fine mesh type and preferably can be monospheric. An apparatus for carrying out the method is devoid of any elements which effect a compacting of the resin during normal operation. The method and apparatus is particularly directed to water treatment. In another embodiment, cocurrent proportional regeneration of a resin bed is effected using resins with nonoverlapping terminal velocities in two different ionic forms.

26 Claims, 3 Drawing Sheets

RESIN BED FOR LIQUID TREATMENT

CROSS REFERENCE TO RELATED APPLICATIONS

This is a continuation-in-part of application Ser. No. 07/560,472 filed Jul. 27, 1990 now abandoned which is a continuation of application Ser. No. 07/308,076 filed Feb. 8, 1989 now abandoned.

BACKGROUND OF THE INVENTION

This invention relates generally to an improved method employing an ion exchange resin, and in one embodiment to the use of a fluidized resin bed in combination with a high kinetic resin in an upward liquid service flow. In another embodiment, it is directed to partial salting or proportional regeneration of a resin bed.

Various methods have been employed in liquid treatment with an ion exchange resin. A common approach in using water as the treated liquid is that indicated in U.S. Pat. No. 4,737,275 which is commonly assigned and shows downward flow for service and regeneration. In that patent, raw water is introduced at the top of the resin bed and the treated water is removed from the bottom. Upward water treatment flow in a resin bed is also known. For example, in an article entitled "New Developments in Counter-Current Fixed Ion Exchange" by I. M. Abrams appearing in the 34th International Water Conference (1973), a partially fluidized bed is described with an upward service flow of the water. However, this article, as does many others, teaches that a fully fluidized bed operation is not to be employed and accordingly uses a fluidized bed in one portion and a fixed bed in another. One reason a completely fluidized resin bed is contra-indicated is that it can produce voids in the resin bed and therefore water could pass through the resin bed without being treated. An apparatus for preventing such voids and effecting a compact resin bed is disclosed in U.S. Pat. No. 4,337,153.

In a paper published at the 39th annual meeting of the International Water Conference in Pittsburgh, Pa. (Oct. 31, Nov. 1,2-1978) by F. Martinola IWC-78-5 entitled "The Lewatit-WS-Process a Highly Reliable Counter-Current System For Ion Exchange And Adsorption", the well known counter-current operation of an ion exchange resin bed was discussed. As stated in that paper, in most of the counter-current processes, the mass of resin is kept in a compressed position in the exhaustion phase as well as in the regeneration phase. However, one process is described which utilizes a totally fluidized bed in the exhaustion phase. A publication is referred to which is Wofatit-Information, DDR, Wofatit KPS, KPS-AS, (Aug., 1978). However, there is no description of the use of high kinetic resins so that an efficient fluidized bed procedure can be effected.

Partial salting or proportional regeneration of a resin bed is described in U.S. Pat. Nos. 3,048,274 and 4,379,057. However, there is no teaching of cocurrent service flow and regeneration with monospheric resins.

SUMMARY OF THE INVENTION

In accordance with one embodiment of this invention, there is provided a liquid treating method in the form of operating a water softener or deionization system wherein a bed of ion exchange resin is placed in a container or tank having an inlet for untreated water and a spaced outlet for treated water. A high kinetic resin is placed in the container and untreated water is flowed upwardly through the resin bed of the high kinetic resin such that there is effected a completely fluidized bed at designed flow rates. In one embodiment, the high kinetic resin is of a fine mesh type wherein the particle size is of at least 30 mesh or a higher mesh number or has a particle diameter of 0.59 mm. or smaller. Preferably the resin is 30-60 mesh (0.59 mm. to 0.25 mm.). In another embodiment the fine mesh resin is of a uniform size.

In still another embodiment, regeneration of the fine mesh resin is effected in a counter-current manner with respect to the exhaustion or service phase and can be advantageously employed in conjunction with a partial regeneration or partial salting operation.

There is also provided a liquid treatment apparatus for carrying out the previously described method which includes a receptacle for containing a bed of high kinetic ion exchange resin. Means to introduce water to be treated into the resin bed is positioned near the bottom of the receptacle. There are also means to remove treated water from the receptacle near the top thereof. The receptacle is devoid of any elements which effect a compacting of the resin during normal operation.

In still another embodiment, monospheric resin is placed in a receptacle with the resin having nonoverlapping terminal velocities in two different ionic forms. Liquid to be treated is flowed upwardly such that there is effected a fluidized or partially compacted bed, and the resin in one ionic form is positioned in a separate layer in the bed from that in another ionic form.

In yet another embodiment, raw water is flowed downwardly through a bed of resin having nonoverlapping terminal velocities in two different ionic forms until some of the resin at the top portion of the resin bed has been changed to a different ionic form. A liquid is subsequently introduced upwardly through the resin bed so as to place the resin in the different ionic form at the bottom portion of the bed. A regenerant fluid is then flowed downwardly through the resin bed to effect partial salting or proportional regeneration.

It is an advantage of the present invention to provide an improved method of operating an ion exchange resin bed for water treatment.

It is an additional advantage of the invention to provide an improved method of water treatment wherein a fluidized resin bed is employed in conjunction with a high kinetic resin.

A further advantage is a fluidized resin bed procedure for water treatment wherein pressure drops through the bed are maintained at a minimum amount.

Yet another advantage is a method of the foregoing type wherein a monospheric or uniform size resin is utilized which obviates the problems concerned with interrupted service during the exhaustion phase.

An additional advantage of this invention is the utilization of an ion exchange water treatment tank which has a minimum number of operating components or parts.

Still another advantage is the use of a fluidized bed in conjunction with a partial regeneration or salting operation with a monospheric resin.

Yet another advantage is a partial salting or proportional regeneration process which employs monospheric resin in conjunction with downflow service and downflow regeneration.

DETAILED DESCRIPTION OF THE EMBODIMENTS

Figure 1:
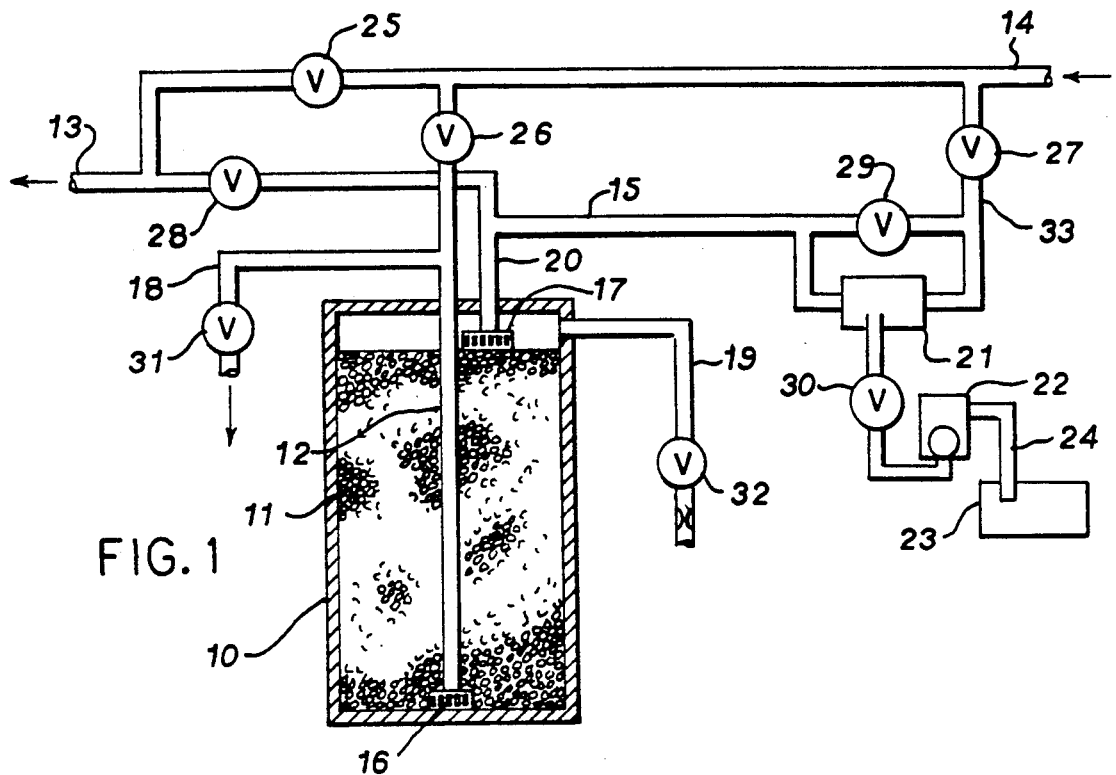
FIG. 1 is a schematic view of a system for utilizing the fluidized resin bed process of this invention with the resin tank shown in vertical section.

Referring to FIG. 1, the fluidized bed method is operable in conjunction with the usual softening tank 10 which will include a resin bed 11. An inlet line 12 extends into the tank and has its discharge opening near the bottom terminating in a distributor 16. It is supplied with untreated water from line 14 controlled by the valve 26. At the opposing end of the tank 10 there is an outlet line 20 terminating in the distributor 17 position near the top. A first drain line 18 is innerconnected with the inlet line 12 and is controlled by the valve 31. A second drain line 19 is connected to the tank 10 and is controlled by the valve 32. The outlet line 20 leads from the tank and is connected to the service outlet 13 controlled by the valve 28.

Raw water can be delivered to a brine injector or eductor 21 through the common line 33 controlled by the valve 27 and brine can flow through the valve 30 and the check valve 22 innerconnected to a brine line 24 extending to a brine tank 23.

Service Operation

Figure 2:
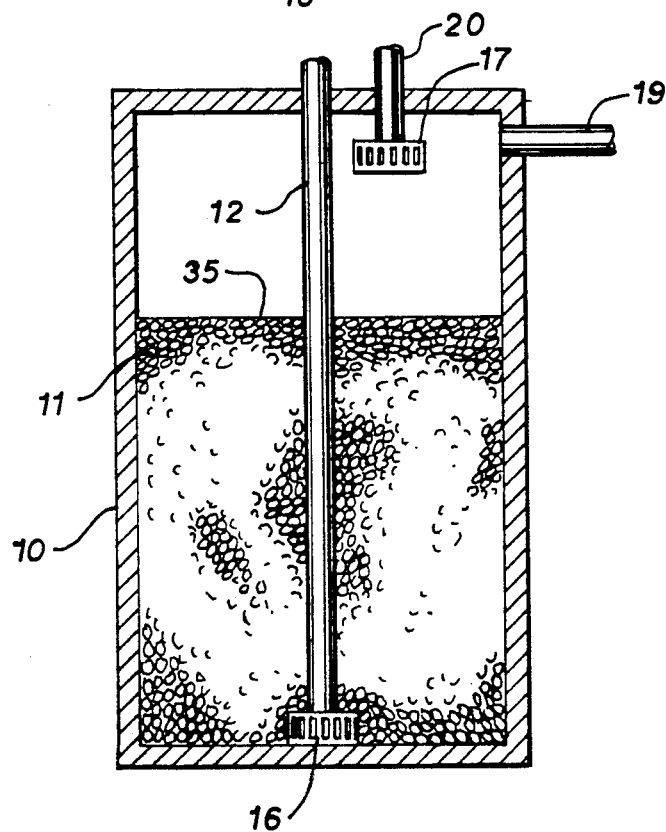
FIG. 2 is a sectional view showing the resin tank in FIG. 1 in a different state of operation.

During a typical water treatment procedure, the resin bed 11 is composed of a cationic exchange resin and in the settled state has the appearance as shown in FIG. 2. The top level of the bed is indicated by the numeral 35. Raw water is introduced at the bottom of the tank 10 by opening the valve 26 as well as the valve 28. This allows water to flow from the inlet line 14 down through the inlet line 12 and out of the distributor 16. It is seen with respect to FIG. 1 and the condition of the resin bed 11 that the particles of the ion exchange resin are in a completely fluidized state. This completely fluidized bed would be effected in a typical size household tank 10 wherein the tank would be 8×35 inches, the flow of water through the tank would be about 1.2 GPM, and the settled resin bed would constitute 66% of the tank volume. The temperature of the water would be 54° F. It should be noted that there is absent any structure in the tank 10 which would inhibit upward flow of the resin. The resin size is an important feature in the process in that it must be of the high kinetic type. That is, it must be able to exchange ions in a very fast manner without requiring any packing of the resin. It will be appreciated that packing of the resin as indicated in the prior art causes undesired pressure drops in the system. During the cycle of service operation, the valves 25, 27, 29, 30, 31 and 32 are closed.

Regeneration

When it is time to regenerate the resin bed 11, the first step is a brining procedure followed by a rinse step. For these operations a counter-current flow is effected in the resin bed 11. With valves 25, 27, 30 and 31 open, and valves 26, 28, 29 and 32 closed, brine is drawn from the brine tank 23 up through the brine line 24 and the check valve 22 as well as through lines 15 and 20. Brine enters at the top of the tank through the distributor 17 and flows downwardly through the resin then through the distributor 16 and ultimately upwardly through the previously described inlet line 12 to the drain line 18. When the contents of the brine tank 23 are exhausted, the air check valve 22 closes to prevent air from being injected into the system. Water continues to flow through the injector 21 free of brine. This water will function to rinse the resin bed 11 to remove excess brine. This is known as the slow rinse operation. Untreated water is supplied to the service outlet 13 during this state of operation through the open valve 25 in the line 14.

The next step is a fast rinse which will also be in a downflow condition in the tank 10 with valve 29 being opened as well as valves 25, 27 and 31. Valves 26, 28, 30 and 32 in this instance are closed.

The last step is a backwash procedure. This is accomplished with valves 25, 26 and 32 being opened and valves 27, 28, 29, 30 and 31 being closed. This directs the backwash to drain line 19. It is best to backwash last after purge. This eliminates a slug of hard water in the initial service water. If a two tank system is employed, then the usual regeneration sequence of cycles can be employed with the first step being the backwash, or it could employ the backwash at the end of the cycle as previously indicated.

Figure 3:
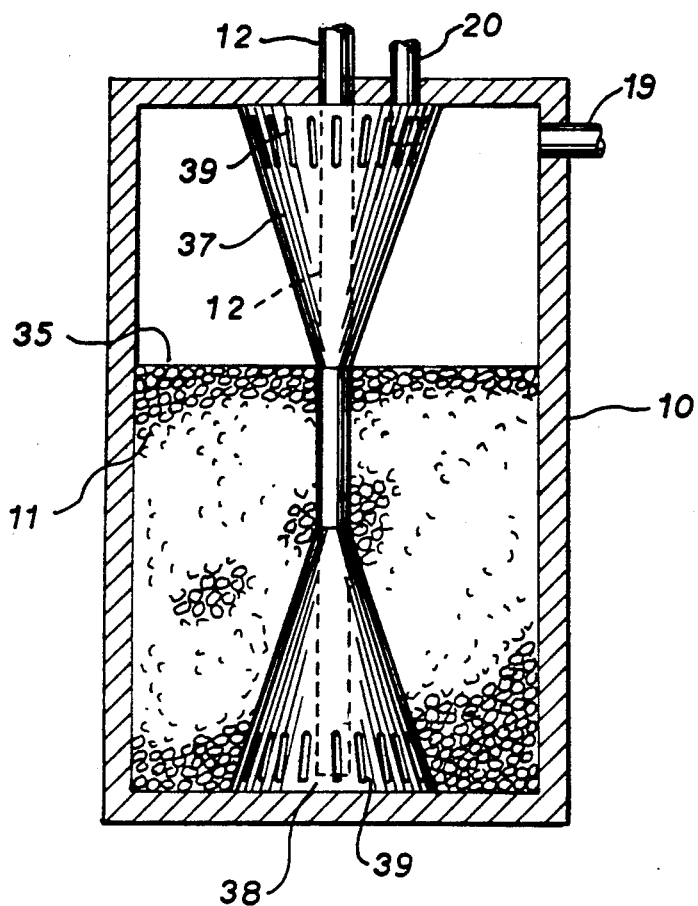
FIGS. 3 and 4 are views similar to FIG. 2 showing alternative embodiments of resin tanks for use in the process of this invention.
Figure 4:
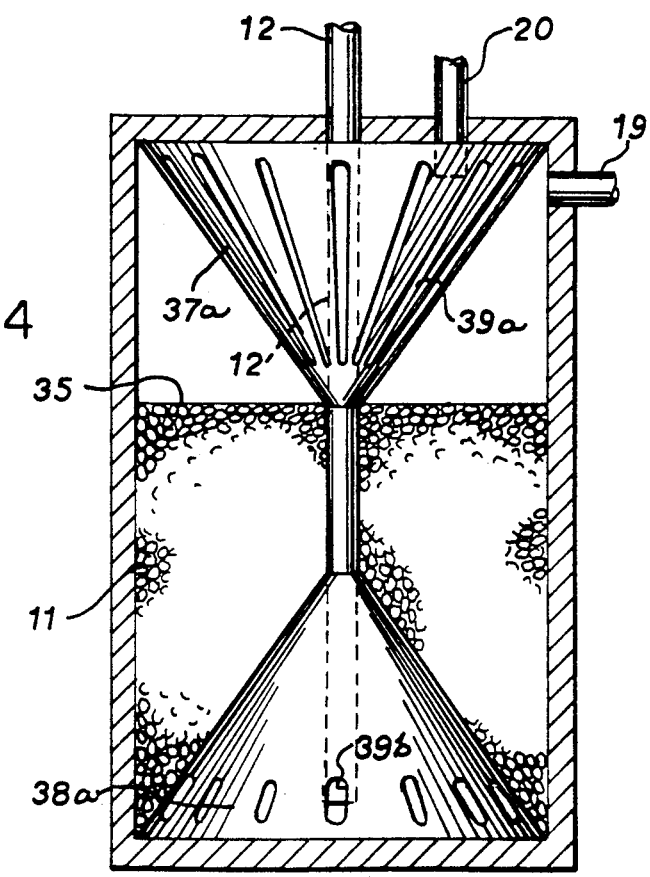

FIGS. 3 and 4 represent alternative embodiments wherein the resin tank 10 has the same previously described inlet line 12 for untreated water, but in this instance there are pairs of frusto-connically shaped distributors 37, 38 and 37a, 38a positioned at opposite ends of the tank and surrounding the inlet line 12 as well as outlet line 20. They each have apertures 39, 39a and 39b for allowing water to pass there through yet are small enough to prevent passage of resin beads. In the instance of the lower distributors 38, 38a, they serve the same function as the previously described distributor 16. However, in the instance of the distributors 37, 37a, they not only serve the same function as the distributor 17 but also provide a means for determining where any packing of the resin 11 starts after a predetermined flow rate of water is exceeded. For example, at a predetermined gallon per minute service flow, a partially fluidized bed is effected in the tank 10. The device could be designed so that at about twice the initial flow rate, a completely fluidized bed would be effected. In addition at about three or four times the initial flow rate, a partially packed bed would come into play with the distributors 37 and 37a determining how the packing would be effected. In all other respects the embodiments in FIGS. 3 and 4 operate the same as those described in FIGS. 1 and 2.

The previously indicated partially fluidized, completely fluidized and partially compacted resin bed could be effected without any internal apparatus in the resin tank 10 by utilizing the hydraulic properties of the different resin or bead sizes. For example a fine mesh resin having a size distribution range of 50-70 or 100-200 mesh could be employed on top of a coarse mesh resin having a 10-20 mesh distribution. This layering system should allow bead to bead contact in either layer depending upon flow rate. Monospheric bead sizes or the coarse and fine mesh resins would allow even greater improvements. If desired, a third layer of fine mesh resin could be employed. In this case the previously indicated coarse mesh resin would be on the bottom, the 100-200 mesh resin on the top and the 50-70 mesh resin inbetween.

In fact, a monospheric resin with nonoverlapping terminal velocities obviates many of the problems encountered with prior art processes that have partially compacted resin beds at the top of the rank. This is due to the fact that when service flow is interrupted, the monospheric resin settles in layers with the resin that is least exhausted in the desired ionic form settling at the top of the bed. This allows for flow to be resumed, and the return of the partially compacted bed with the compacted bed consisting of resin in the desired ionic form. The monospheric resin eliminates the problems and additional tasks associated with counter current start up and cessation of flow during exhaustion. The prior art states that it is important not to disturb the layered zones in different ionic forms. See pages 3 and 4 of the previously referred to Martinola IWC-78-5-article. These desired layered zones of resin are less likely to be disturbed when a monospheric resin with nonoverlapping terminal velocities in different ionic forms is used as is more fully later explained herein.

The following Examples are representative of actual data generated in conjunction with the previously described fluidized resin bed process. In each instance the tank 10 had a diameter of 8 inches with a 34 inch height and a freeboard space of 11 inches. The resin volume was 0.62 ft3.

EXAMPLE I

An Ionac C-266 resin was employed with a service up-flow rate of 1.14 GPM. The mesh size of this resin has a typical distribution of 97.5% between 30-60 mesh. At a flow of 1.13 GPM the resin bed was lifted to 1.75 inches from the top of the tank outlet 17 resulting in a completely fluidized bed. This resulted in a softening capacity of 22,311 gr./ft3 utilizing 6 lbs./ft3 salt dosage. The inlet water was about 29 gr./gal. and the effluent was less than about 0.1 gr./gal. Preceding the service flow, there was effected a backwash step, a brine step, a slow rinse and a purge. This Example demonstrates a completely fluidized bed with a fine mesh resin.

EXAMPLE II

In this Example the same resin was employed as in Example I having the same mesh size. The tank size, the resin volume, the inlet water and the salt dosage were the same as in Example I as were the timing and flow rates of the service, as well as the backwash, brining, rinse and purge steps. The difference is that the service flow rate was increased at one stage to 4.07 GPM resulting in 13.5 inches of resin packed tightly against the top of tank 10 with the remaining portion being fluidized. This resulted in a softening capacity of 21,811 gr./ft3. This Example demonstrates partial compaction of the resin bed.

As indicated previously, a high kinetic resin is what allows the totally fluidized bed as described herein to operate in an efficient manner with a continuous service flow. As stated by James M. Montgomery in "Water Treatment Principles and Design", page 217 (1985), the size of the ion exchange material will have the greatest influence on a process' kinetic behavior. A resin with a mesh size of 30 or a greater mesh number works well in the fluidized bed of this invention. As also indicated at page 218 of the same publication, cross-linking is a principal factor affecting interstitial pore size in a synthetic resin. Therefore, it will be a factor in particle-diffusion-controlled processes. In the process of this invention, a cross-linked resin having a divinylbenzene content of various percentages can be advantageously utilized. For water softener applications a range of about 8-12% DVB would be preferable.

Another important feature of this invention is not only the use of a high kinetic resin in the fluidized bed, but also one that is monospheric. The use of this type of resin has the advantages of obviating the problems concerned with intermittent flow and the rearrangement of the exhausted resins in the bed at various locations. These problems are described in U.S. Pat. No. 4,461,706 and are attempted to be solved by the resin materials being transferred from one chamber to another. The monospheric resins avoid this problem in that each size when exhausted or in its initial regenerated state will seek the same level in the resin bed in their respective ionic condition. An important consideration is the tolerance of the bead diameter and the range of terminal velocities of the beads in the two different ionic forms which ranges should not overlap. In other words, the terminal velocities for the range of bead sizes in one ionic form should be larger than the terminal velocities of the range of bead sizes in the other ionic form for a given fluid temperature. For example, an 8% DVB cation exchange resin wit a diameter of 0.42 mm. in the H+ form will have a lower terminal velocity than when it is in the Na+ form. This allows the resin in the H+ form to stay above the resin in the Na+ form. This remains true provided the tolerance of the resin bead is about + or −25 microns or less and the water temperature is 20° C.

Monospheric resins of this general type are available from the Dow Chemical Company as DOWEX MONOSPHERE resins or Bayer A. G. Another advantage in using the monospheric resin is that it is especially adaptable for use with a counter-current partial regeneration or partial salting operation utilizing an upward service and a down flow brine. Partial salting is a technique which is described in U.S. Pat. Nos. 3,048,274 and 4,379,057.

Figure 5:
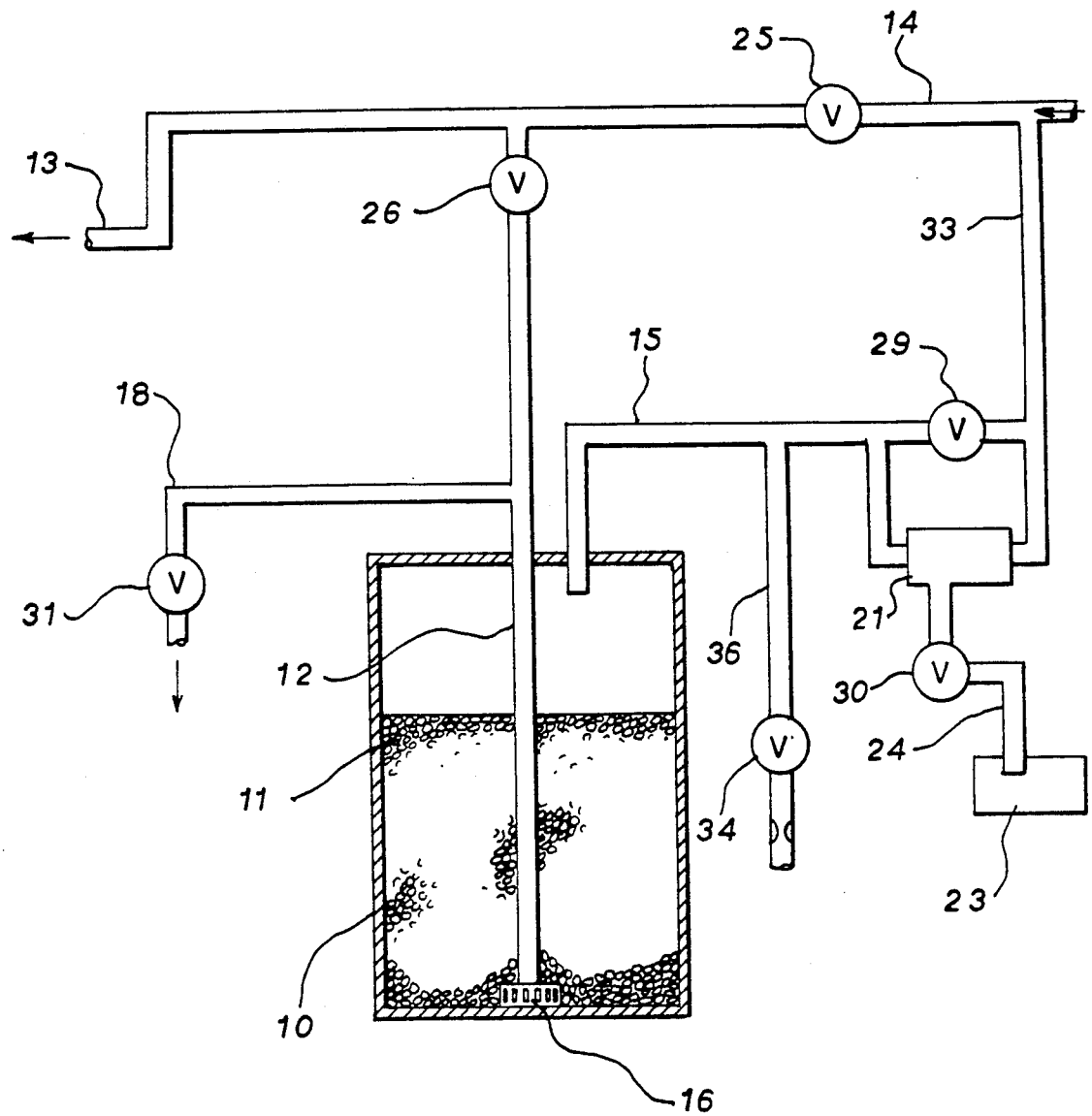
FIG. 5 is a view similar to FIG. 1 showing an alternative process.

The previously described monospheric resins are also adaptable for use with a cocurrent proportional regeneration method wherein both the raw water and the regenerant fluid are introduced at the top of the resin bed. This is now described with respect to a Service Operation and Regeneration procedure as was done previously in conjunction with the fluidized bed process. Reference is made to FIG. 5 in conjunction with FIG. 1 where the same or similar components are referred to by the same numerals.

Service Operation

During a typical water treatment procedure, the resin bed 11 is composed of a monospheric cationic exchange resin such as one having an 8% DVB content and a 420±25 micron size. It is in a settled state and has the appearance as shown in FIG. 5. Raw water is introduced at the top of the tank 10 by opening the valve 29 as well as the valve 26. This allows water to flow from the inlet line 14 down through the inlet line 15 and into the distributor 16. During the cycle of service operation, the valves 30, 25, 31 and 34 are closed.

Regeneration

When it is time to regenerate the resin bed 11, the first step is a backwash procedure followed by regenerant draw and slow and fast rinse steps. For these operations a counter-current flow is first effected in the resin bed 11 for the backwash step. With valves 26, 25, and 34 open, and valves 30, 29 and 31 closed, raw water flows through the line 14 and enters at the bottom of the tank through the distributor 16. It flows upwardly through the resin then through the distributor 16 and ultimately upwardly through the line 15 to the drain line 36.

During the backwash procedure, the ion exchange bed is fluidized and the ion exchange beads become classified by terminal velocity. The beads with the lowest terminal velocity will migrate towards the top of the tank 10. With proper ion exchange resin design (or selection) the beads in the hydrogen form will be at the top of the tank at the end of the backwash step. The settled bed will have predominantly hydrogen form resin at the top of the bed and predominantly exhausted form resin at the bottom of the tank. Resin that is partly in the hydrogen form and partly in the exhausted form will be stratified in a layer between the predominantly hydrogen form resin and the predominantly exhausted form resin. The exhausted resin will be stratified by terminal velocity related to each exhaustion ion. For ease of understanding this stratified exhausted resin will be referred to being in the predominantly exhausted form. It is important to flip the resin bed to get the hydrogen form resin on top otherwise partial regeneration will not work properly.

The next step is a regenerant step. This is effected by opening valves 30, 25 and 31 while closing valves 29, 26, and 34. HCl acid is obtained from a storage tank 23 through an eductor 21. The acid passes through the resin in the hydrogen form with little to no effect. This allows fresh regenerant to pass through and regenerate the exhausted resin at the bottom of the tank. This method restores full capacity to the entire ion exchange bed using only an amount of regenerant proportional to the amount exhausted.

Typical partial regenerant systems patented in the past (Lundeen U.S. Pat. No. 3,048,274 and Meiser U.S. Pat. No. 4,379,057) use upflow regeneration with a resin size distribution that has terminal velocities of different ionic forms that overlap. This requires the addition of regenerant to be done first and, as stated above, in the upward direction. An advantage that the present invention has is the fact that it operates with a downflow regenerant direction. Downflow regeneration is less rate sensitive and more forgiving to changes in operating parameters than upflow regeneration.

A subsequent step is a slow rinse which will also be in a downflow condition in the tank 10 with valve 25 being opened as well as valve 31. Valves 30, 29, 26 and 34 in this instance are closed.

The last step is a purge or fast rinse procedure which is also done in a downward manner. This is accomplished with valves 29, 26 and 31 being opened and valves 30, 25 and 34 being closed. This directs the purge to drain line 18.

Calculations indicate that a cation resin with 8DVB crosslinking and a nominal diameter of 420 microns (40 U.S. mesh) would require a + or −25 micron tolerance on the diameter to obtain ranges in terminal velocities that did not overlap when the resin was in the hydrogen or sodium form. Calculations also indicate that the bead diameter tolerance can be increased as the nominal bead diameter increases. This is an advantage over the previously described fluidized bed procedure because it results in a less expensive resin. The fluidized bed, since it was upflow service, needed resin with fast exchange rates (kinetics) to obtain good effluent quality.

This cocurrent downward flow proportional regeneration can be applied to other ion exchange systems. Anion resin could be used in the same manner described above. Calculations indicate that closer tolerances would be required for anion resins.

This regeneration process could then be used as an improved 2 tank deionization process. Furthermore, an improved water softening process would result from its use. Different types of resin could be employed, and layering of different types of resin could be done in one tank. This layering could be maintained during regeneration if one layer were a weak acid resin and the other were a strong acid resin. Layering of cation/anion/cation/anion could be done if multiple distributors were used for regeneration. Various alterations are possible once one recognizes the importance of resin designed to a specific terminal velocity range. While the proportional regeneration process has been described in conjunction with water treatment, it can also be advantageously employed with respect to aqueous ion exchange procedures in other industries such as the chemical, pharmaceutical and food industries where an aqueous solution is to be treated. In such instances, other fluids than water could be employed to flip the partially exhausted resin bed and other suitable liquids could be employed as regenerants such as base or salt solutions.

As can be seen from the foregoing description of the partial regeneration of the ion exchange resin bed, it allows for partial regeneration of the ion exchange resin bed with the regenerant flowing in the downflow direction. The selection of the ion exchange resin in the mineral tank 10 is key to the proper function. The ion exchange resin should be one that has the terminal velocity of the resin beads in the desirable ionic form less than the terminal velocity of the beads in the undesirable ionic form. This requirement must be met for the entire range of resin bead sizes in the mineral tank 10. This means that the range of terminal velocities of the beads in the desirable ionic form must always be less than the range of terminal velocities of the beads in the undesirable ionic form (or the reverse if the desirable ions are required on the bottom for process reasons). In the previous description, the beads of desirable ionic form must have the lower values for terminal velocities. The ideal ion exchange resin for this invention would be one of uniform bead size. A cation exchange resin of one size would have a lower value for terminal velocity when it is in the hydrogen form than when it is in either the sodium, calcium or magnesium form. This is a fact even though the bead in the hydrogen form has a larger diameter. Conventional thought on this is opposite (i.e. larger beads have higher terminal velocities and tend to be at the bottom of a settled ion exchange resin bead). Since it is very difficult and expensive to obtain an ion exchange resin bed with all the beads having exactly the same diameter, tolerances for bead diameters and/or terminal velocity ranges are necessary. The tolerance should be such that the range of terminal velocities when the bead is in one ionic form do not overlap the range of terminal velocities when the bead is in a different ionic form.

Referring again to the fluidized bed which has been previously described in conjunction with water treatment as a softening operation, it can also be advantageously employed with other liquid treatments involving ion exchange resins such as for example a water deionizing, dealkalization or denitrification system. When employed in this capacity, the treatment tank 10 would contain a resin which can be either a cation exchange resin or an anion exchange resin depending upon the type of ions to be removed. In any event, it is within the scope of this invention to use any ion exchange resin whether of the strong or weak acid type or the strong or weak basic type provided it is of the high kinetic type.

As used herein in conjunction with the fluidized bed procedure, the term "high kinetic resin" means any ion exchange resin which under similar conditions has an ion exchange rate at least about 20-30% faster than a standard resin or having an ion exchange rate under similar conditions equivalent to a resin having a particle diameter of about 0.59 mm. or smaller. A standard resin is of the cation and anion type, gel, macroporous or macroreticular of which the following are representative: Sybron IONAC ASB-1, A-641, AFP-329 CFP-110, C-249, C-267, CC and CNN; Rohm & Haas AMBERLITE IRA-400, IRA-900, IRA-93/94, IR-200, IR-120 Plus, IR-120 Plus (H+), DP-1 and IRC-84; Dow DOWEX SBR, MSA-1, MWA-1, MSC-1, HCR-S and CCR-2.

As indicated previously, the monospheric resins from Dow or Bayer can be advantageously utilized. Any other ion exchange resin of the high or fast kinetic type can be used such as the previously mentioned Ionac C-266 resin from Sybron Corporation.

The fluidized bed system of this invention offers several advantages as can be seen from the fact that it employs an upward flow exhaustion or service and not the standard counter-current systems that are upward flow regeneration and downward flow service. It was previously thought that when employing a resin bed either for exhaustion or regeneration that it should remain packed in order to have an efficient process. In order to do this, apparatus such as bladders or horizontal distributors were employed in the resin tank. In the process of this invention, these are obviated. It was also believed that when using fine mesh resins in prior art systems that large pressure drops would typically be associated with them. In the present system, and by using an up-flow service in a totally fluidized bed with a high kinetic resin, the pressure drop due to the resin is nearly negligible whereas, when the resin bed begins to compact, the pressure drop due to the resin approaches that of a downflow system as the percent of compaction increases. The present system also offers the advantages of a fast regeneration rate because of the faster kinetics of the resin. It is estimated that regeneration can be effected in as little as ten to fifteen minutes or less utilizing certain tank systems.

I claim:

1. A method of operating a water softener or deionization system wherein a bed of ion exchange resin is placed in a receptacle having an inlet for raw water to be treated and a spaced outlet for treated water comprising;

placing a high kinetic resin in said receptacle, said resin having an ion exchange rate equivalent to a resin having a particle diameter of about 0.59 mm. or smaller; and flowing raw water to be treated upwardly through said bed of high kinetic resin such that there is effected a substantially complete fluidized bed without compacting of said resin at design flow rates, said water and said resin assuming substantially parallel flow paths while maintaining said resin in said receptacle, wherein the water treatment step with the fluidized bed consists essentially of the only water treatment with said resin.

2. The method of claim 1 wherein said method is employed in conjunction with a proportional regeneration operation.

3. The method of claim 1 wherein there is at least one layer of said high kinetic resin positioned over another layer of coarse mesh resin.

4. The method of claim 1 wherein said high kinetic resin is of a fine mesh.

5. The method of claim 4 wherein said fine mesh resin is of the cation exchange type.

6. The method of claim 4 wherein said fine mesh resin is of the anion exchange type.

7. The method of claim 4 wherein regeneration of said fine mesh resin is effected in a counter-current manner.

8. The method of claim 4 wherein said fine mesh resin is of a uniform size.

9. The method of claim 8 wherein terminal velocity ranges of the resin when in two different ionic forms do not overlap.

10. A liquid treatment apparatus for the exchange of ions between a liquid and a resin comprising:

a receptacle containing a bed of high kinetic ion exchange resin, said resin having an ion exchange rate equivalent to a resin having a particle diameter of abut 0.59 mm. or smaller;

means for introducing liquid to be treated into said resin bed positioned near the bottom of said receptacle to effect a substantially complete fluidized bed at design flow rates including means for directing said liquid and said resin in substantially parallel flow paths; and means for removing treated liquid from said receptacle near the top thereof;

said receptacle defining a continuous side wall surface so as to prevent the flow of said resin from said receptacle and being devoid of any elements which effect a compacting of said resin during normal operation.

11. The water treatment apparatus of claim 10 wherein said resin is a fine mesh resin and is of a uniform size.

12. The liquid treatment apparatus as defined in claim 10 wherein said liquid treatment apparatus is a water treatment apparatus and said means to introduce said liquid near the bottom of said receptacle is a raw water line extending through said receptacle from the top thereof.

13. The water treatment apparatus as defined in claim 12 further including an inclined distributor extending downwardly from the top of said receptacle.

14. The water treatment apparatus as defined in claim 13 further including a second inclined distributor extending upwardly from the bottom of said receptacle.

15. A method of operating a liquid treating ionization exchange system wherein a bed of ion exchange resin is placed in a receptacle having an inlet for liquid to be treated and a spaced outlet for treated liquid comprising:

placing a monospheric resin in said receptacle, said resin having nonoverlapping terminal velocities in two different ionic forms within a given type of resin; and flowing liquid to be treated upwardly through said bed of said resin such that there is effected a fluidized bed or a partially compacted bed and said resin in one ionic form is positioned in a separate layer in said bed from that in another ionic form.

16. A method of operating an ionic exchange fluid treatment system wherein a bed of ion exchange resin is placed in a receptacle having an inlet for untreated fluid to be treated and a spaced outlet for treated fluid comprising:

placing at least one type of high kinetic resin in said receptacle, said one type of high kinetic resin having nonoverlapping terminal velocities in two different ionic forms and having an ion exchange rate equivalent to a resin having a particle diameter of about 0.59 mm. or smaller; and flowing fluid to be treated upwardly through said bed of said resin such that there is effected a fluidized bed or a partially compacted bed and the resin in one ionic form is positioned in a separate layering the bed from that in another ionic form.

17. A method of operating an ion exchange fluid treatment system wherein a bed of ion exchange resin is placed in a receptacle having an inlet for untreated fluid for raw material to be treated and a spaced outlet for treated fluid comprising:

placing a resin in said receptacle so as to effect a bed of resin, said resin having nonoverlapping terminal velocities in two different ionic forms within a given type of resin;

flowing fluid to be treated downwardly through said bed of resin until some of said resin at a top portion of the resin bed has been changed to a different ionic form;

introducing a fluid upwardly through the resin bed so as to place said resin in said different ionic form at a bottom portion of said resin bed; and flowing a regenerant liquid downwardly through said resin bed.

18. The method of claim 17 wherein said liquid introduced upwardly through the resin bed is effected by a backwashing step.

19. The method of claim 17 wherein said regenerant fluid is an acid solution.

20. The method of claim 17 wherein said regenerant fluid is a basic solution.

21. The method of claim 17 wherein said regenerant fluid is a salt solution.

22. The method of claim 17 wherein said method is employed in conjunction with a deionization system.

23. The method of claim 17 wherein said method is employed in conjunction with a water softener system.

24. The method of claim 17 wherein said resin is monospheric.

25. The method of claim 24 wherein said monospheric resin is of a cation exchange type.

26. The method of claim 24 wherein said monospheric resin is of a anion exchange type.

* * * * *

UNITED STATES PATENT AND TRADEMARK OFFICE
CERTIFICATE OF CORRECTION

PATENT NO. : 5,250,187

DATED : October 5, 1993

INVENTOR(S) : Jeffrey G. Franks

It is certified that error appears in the above-identified patent and that said Letters Patent is hereby corrected as shown below:

On the title page: ITEM

| | |
|---|---|
| [56] References Cited | U.S. Patent Documents after "4,120,786 10/1978" "Peterson" should be --Petersen--. |
| Column 5, line 5 | after "size" "or" should be --for--. |
| Column 5, line 14 | after "of the" "rank" should be --tank--. |
| Column 6, line 34 | after "resin" "wit" should be --with--. |
| Column 7, line 66 | after "8" --%-- should be added. |
| Column 10, Claim 10, line 6 | before "0.59 mn." "abut" should be --about--. |
| Claim 11, Claim 16, line 15 | after "separate" "layering" should be --layer--. |

Signed and Sealed this

Twenty-sixth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,250,187

DATED : October 5, 1993

INVENTOR(S) : Jeffrey G. Franks

It is certified that error appears in the above-identified patent and that said Letters Patent is hereby corrected as shown below:

Title page, item

| | |
|---|---|
| [56[ References Cited | U.S. Patent Docoments after "4,120,786 10/1978" "Peterson" should be --Petersen--. |
| Column 5, line 5 | after "sizes" "or" should be --for--. |
| Column 5, line 14 | after "of the" "rank" should be --tank--. |
| Column 6, line 34 | after "resin" "wit" should be --with--. |
| Column 7, line 66 | after "8" --%-- should be added. |
| Column 10, Claim 10, line 6 | before "0.59 mm." "abut" should be --about--. |
| Column 11, Claim 16, line 15 | after "separate" "layering" should be --layer in--. |

UNITED STATES PATENT AND TRADEMARK OFFICE
CERTIFICATE OF CORRECTION

Page 2 of 2

PATENT NO. : 5,250,187
DATED : October 5, 1993
INVENTOR(S) : Jeffrey G. Franks

It is certified that error appears in the above-indentified patent and that said Letters Patent is hereby corrected as shown below:

This certificate supersedes Certificate of Correction issued July 26, 1994

Signed and Sealed this

Twenty-fourth Day of January, 1995

Attest:

BRUCE LEHMAN

*Attesting Officer*     *Commissioner of Patents and Trademarks*